United States Patent [19]
Smestad

[11] 3,834,254
[45] Sept. 10, 1974

[54] TAPERING TOOL
[76] Inventor: Delmer L. Smestad, P.O. Box 1164, Williston, N. Dak. 58801
[22] Filed: Jan. 4, 1973
[21] Appl. No.: 320,972

[52] U.S. Cl. ............ 82/4 C, 408/118, 408/197, 144/205
[51] Int. Cl. ............ B23b 5/16
[58] Field of Search ...... 408/146, 118, 153, 181, 408/185, 224, 229, 231, 186; 144/205; 82/4 C

[56] References Cited
UNITED STATES PATENTS

| | | | |
|---|---|---|---|
| 470,295 | 3/1892 | Feldt et al. | 408/185 |
| 1,791,649 | 2/1931 | Vosper | 408/231 |
| 2,807,297 | 9/1957 | Lucas | 144/205 |
| 3,304,597 | 2/1967 | Kezran | 408/224 |
| 3,361,017 | 1/1968 | Baumgarten | 144/205 |

FOREIGN PATENTS OR APPLICATIONS

| | | | |
|---|---|---|---|
| 1,138,916 | 10/1962 | Germany | 82/4 C |

*Primary Examiner*—Francis S. Husar

[57] ABSTRACT

A pipe tapering tool formed in separable parts for internal and external tapering. External tapering is achieved by placing the tool between a drum and an adjustable outer blade housed in one of the parts. The other part severable therefrom provides adjustable blades for internal tapering, the parts being interconnected for this purpose whereby they may be turned together relative to the pipe.

1 Claim, 5 Drawing Figures

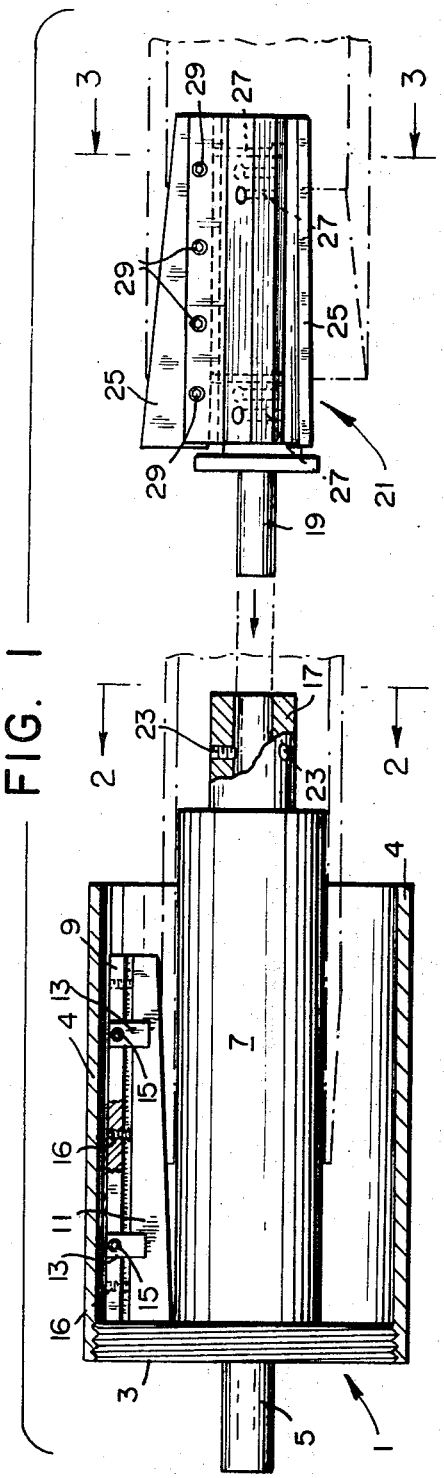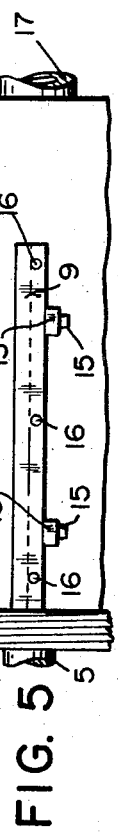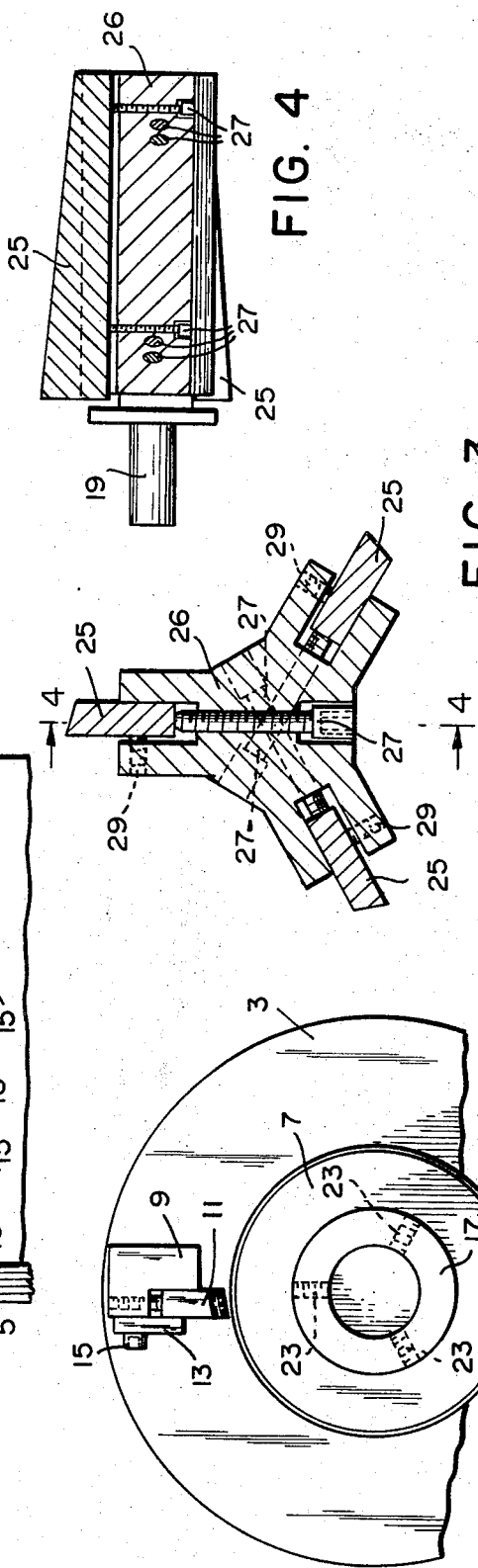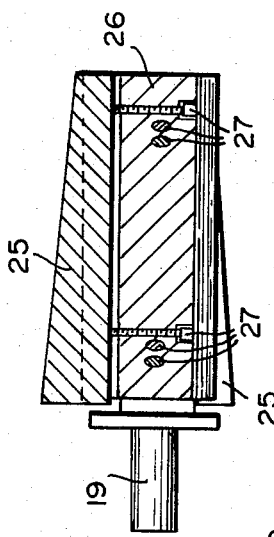

TAPERING TOOL

The invention relates to pipe cutting tools and in particular to tools for imparting bevel or taper to pipes.

The instant pipe taperer is adapted for working on fiberglass pipes but may be used for cutting pipe fabricated of other material. The tool is provided with external and internal pipe cutting blades and is severable to permit external cutting of various size pipes to be performed without interference from the section of the tool which provides the internal cutting. The blades are angularly adjustable for cutting to the desired bevel or taper.

One object of the invention is to provide a unique pipe cutting tool which optionally affords internal or external tapering of the ends of pipes.

Another object of the invention is to provide an internal-external pipe taperer which permits external tapering of various size pipes.

Other objects and advantages of the invention may be appreciated on reading the following description of one embodiment thereof which is taken in conjunction with the accompanying drawings which:

FIG. 1 is an exploded view showing the separable parts of the pipe taperer;

FIG. 2 is an end view taken on the line 2—2 of FIG. 1 showing the external pipe taperer portion of the cutter;

FIG. 3 is a section taken on line 3—3 of FIG. 1 showing the internal pipe taperer portion of the cutter;

FIG. 4 is a section taken on line 4—4 of FIG. 3; and

FIG. 5 is a fragmentary top view of the arm which supports the external pipe tapering blade and reinforcing members therefor.

Referring to the drawings external pipe taperer 1 includes an end plate 3 of cylinder 4 which is mounted on turn shaft 5. Concentrically mounted in the inner face of the plate 3 is drum 7 the external diameter of which is nearly identical to the internal diameter of the pipe which is to be externally tapered. On the same face proximate the circumference of the drum is blade holder 9 on an outer shoulder of which is disposed blade 11 being held in position by clamping plate 13. Screws 15 extend through the holder 9 and the clamping plate whereby on application of nuts the desired tapering angle of the blade 11 as determined by adjusting screws 16 relative to the holder and drum may be operatively maintained.

Secured to the inner face of the drum 7 is tool receiver 17 having an internal bore to accommodate extension member 19 of internal pipe taperer 21. Set screw 23 holds the two sections together for internal pipe cutting.

The taperer 21 is provided with three blades 25 disposed approximately 120° apart in the body 26. Each blade is disposed in slots and is set to the desired tapering angle by adjusting screws 27 extending through the tool from the opposing side of the blade and engaging the side of the blade opposite to its cutting edge. Fastening screws 29 bear on the faces of the blades to hold them in the desired operative position.

In operation the pipe is initially set at the extreme inner end of the blades and is pushed outwardly by manual or other means until the desired length of taper is achieved as the tools is rotated on the shaft 5.

Various modifications may be made in the invention without departing from the scope and principle thereof as defined in the appended claims.

I claim:

1. An external pipe taperer comprising a cylinder, an end plate secured to one end of said cylinder, a turn shaft mounted on the outer face of said plate, a drum mounted on the inner face of the plate and disposed longitudinally of said cylinder, a blade holder mounted longitudinally of the cylinder on the inner wall surface thereof, and a tapered blade adjustably attached to the holder in spaced relation to said drum whereby the pipe to be tapered is adapted to be received in said space as said cylinder and blade is turned on said shaft.

* * * * *